Patented Jan. 1, 1946

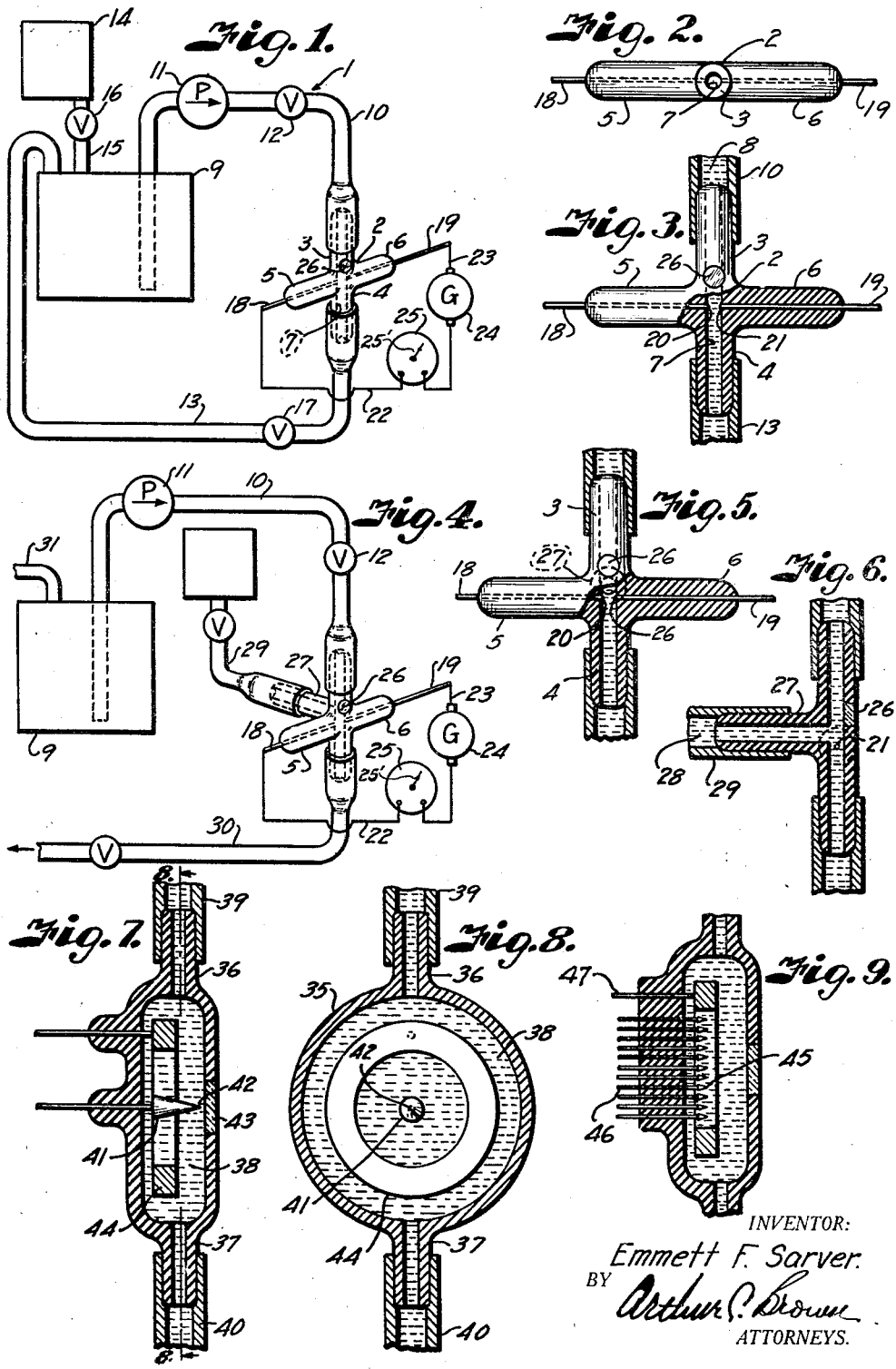

2,392,003

UNITED STATES PATENT OFFICE 2,392,003

METHOD AND APPARATUS FOR DETECTING AND MEASURING RADIANT ENERGY SUCH AS LIGHT

Emmett F. Sarver, Wichita, Kans., assignor of one-half to O. W. Wortman, Wichita, Kans.

Application September 26, 1942, Serial No. 459,864

14 Claims. (Cl. 201—63)

This invention relates to a method and apparatus for detecting and measuring radiant energy such as light, and has for its principal object to translate light intensities to electrical currents having values in direct linear proportion to increase in light intensity up to a predetermined maximum.

Other objects of the invention are to provide a relatively small, compact apparatus which is not injured when the intensity of light passes a predetermined maximum; to provide an apparatus which is quick to respond without appreciable time lag; to provide for translating light fluctuations into high frequency electrical fluctuations; to provide an apparatus that will indicate light of relatively minute intensity; to provide an apparatus which may be controlled both as to intensity and the wave lengths of light which it will indicate; and to provide for circulating an electrolyte or light sensitive liquid in contact with the current conductive electrodes of the apparatus.

It is also an object of the invention to provide a more efficient, self-generating current device responsive to light intensity wherein the light sensitive element is protected when the light intensity rises above a predetermined value.

In accomplishing these and other objects of the invention, hereinafter pointed out, I have provided an improved method and apparatus illustrated in the accompanying drawing, wherein:

Fig. 1 is a diagrammatic view of an apparatus embodying the features of the present invention.

Fig. 2 is a plan view of the light sensitive cell used in the apparatus.

Fig. 3 is a front elevational view of the cell, parts of which are broken away to better illustrate the construction thereof.

Fig. 4 is a diagrammatic view of a modified form of apparatus.

Fig. 5 is a front view of the form of cell illustrated in Fig. 4, parts of which are broken away to better illustrate the construction thereof.

Fig. 6 is a vertical section through the cell illustrated in Fig. 5.

Fig. 7 is a longitudinal section through a further modified form of cell.

Fig. 8 is a section on the line 8—8 of Fig. 7.

Fig. 9 is a vertical section through a further modified form of cell.

Referring more in detail to the drawing:

1 designates an apparatus for detecting and measuring radiant energy such as light and which is adapted for translating light sensitivity to an electric current of corresponding value.

The apparatus includes a light sensitive cell 2 formed of any suitable dielectric material, for example hard rubber, opaque glass, or the like, and comprises a cross-shaped member having axially aligned arms 3—4 intersected by transversely aligned arms 5—6.

The arms 3 and 4 have an axial flow passageway 7 of relatively small diameter and through which a light sensitive fluid 8 is caused to circulate from a source of fluid supply contained in a vessel 9. The vessel 9 is connected near the bottom thereof with the arm 3 by means of a duct 10 and in which is interposed a circulating pump 11 and a control valve 12. The duct may be of any suitable material, for example a rubber tube, and has the outlet end thereof sleeved over the arm 3 so as to make a fluidtight connection therebetween. The arm 4 is connected by a similar duct 13 wherethrough the light sensitive fluid is discharged to a waste or returned to the supply vessel 9 for reconditioning by fluid admitted to the supply vessel from a receptacle 14 through a pipe 15 provided with a control valve 16. If desired, the return duct 13 may also be provided with a control valve 17.

The other arms 5 and 6 of the light sensitive cell mount electrically conductive members or electrodes 18 and 19 that are sealed therein and terminals 20 and 21 protruding a short distance into the flow passage 7 for contact with the fluid circulated therethrough and whereby the fluid forms an electrolyte to complete a circuit therebetween. The outer ends of the members 18 and 19 are connected in an electrical circuit including wires 22 and 23 connected with a source of current supply indicated by a high frequency generator 24. Connected in one of the wires, for example the wire 22, is a current indicating device 25 having an indicator 25' whereby the intensity of the current flowing through the circuit is indicated, it being understood that the current varies in accordance with the character of the light sensitive fluid flowing in direct contact with the terminals 20 and 21 of the conductive members or electrodes 18 and 19.

In order to admit light to the cell for acting upon the fluid flowing therethrough the arm 3 is provided with a window 26 which is located a short distance above the terminals of the electrodes 18 and 19. The window 26 may be formed of a material which will pass light of predetermined frequencies only so that it is only these selected light frequencies that act upon the light sensitive fluid. For example, the lens or window may be of colored glass to filter out the undesired light. It is also possible that a solution may be selected which is sensitive to specific light frequencies which are to be measured. I have found that if the sensitizing solution for X-ray plates and a cell window capable of passing X-rays are used in the cell, the apparatus becomes an indicator of light at the X-ray end of the spectrum. Similarly, if a solution such as used in coating infra-red sensitive photographic plates is employed, the cell becomes responsive to light rays at the infra-red end of the spectrum. Therefore a cell may be provided which has a pronounced sensitivity for some predetermined wave length of light by choosing a solution which is most sensitive to that wave length, or by filtering out part of the undesired waves through selection of the window material through which the light is passed.

Thus the light sensitive fluid may be one of any number of known light sensitive photographic solutions. For general purpose a silver nitrate solution may be circulated through the cell. It is well known that when such a solution is exposed to light, metallic silver is formed therein which increases the electric conductivity thereof proportional to the amount of converted silver. Consequently the amount of current flowing through the circuit is directly proportional to the change in conductivity by intensity of the light on the solution flowing through the gap between the terminals 20 and 21.

It will thus be seen that since a constantly fresh stream of liquid is being moved across the window, the electrical conductivity thereof will be varied proportional to the effect of light rays acting thereon at the time the liquid is moving past the window 26. It will also be obvious that the current indicating device 25 will register fluctuations in the current flowing through the circuit as governed by the conductivity of the light sensitive liquid.

The light sensitive liquid is circulated through the cell at a comparatively rapid velocity and due to the relatively small diameter of the flow passageway 7, the liquid will be caused to travel with extreme velocity past the window 26 without making it necessary to circulate a large volume of liquid. Rapid flow of the liquid is important to avoid lag and to effect the desired cross-sectional exposure of the liquid flowing through the passageway without undue loss by absorption in the liquid.

The liquid, after passing the terminals 20 and 21, may be discharged to a waste or returned to the source of supply, where it is reconditioned through contact with a liquid admitted from the receptacle 14. The light passing through the window 26 is directly proportional to change in electrolytic capacity of the solution up to a determined maximum. Beyond this point, the indicating mechanism would continue to register the maximum light intensity because the light sensitive liquid has been exposed to its full capacity. Thus the apparatus may be sufficiently sensitive to indicate very minute light intensities and then be suddenly exposed to full sunlight without injuring the equipment.

In the form of the invention illustrated in Fig. 4 the light sensitive cell is provided at a point between the window 26 and the terminals 20 and 21 of the electrodes with an inlet connection 27 through which a developing solution 28 may be admitted into the flow passageway 7 through a pipe 29 having connection with a source of supply. In this instance the light sensitive solution may be silver bromide and the developing solution pyrogallol so that when the light sensitive solution passes the window, it is affected by the amount of light admitted therethrough and when contacted with the pyrogallol, metallic silver is caused to be suspended in the liquid flowing through the gap between the electrodes. It is obvious that the inlet 27 could be provided with a number of branches so that different solutions could be admitted to the flow passageway. In this arrangement, the spent solution is discharged through a pipe 30 to a waste and new supply is constantly being admitted to the vessel 9 by way of a pipe 31.

In Figs. 7, 8 and 9, I have illustrated modified forms of the invention which include current generating cells wherein the liquid circulated therethrough serves as an electrolyte for conducting a generated current across a light sensitive electrode.

In the form of invention illustrated in Fig. 7, the cell includes a substantially cylindrical body 35, having a liquid inlet connection 36 and an outlet connection 37 through which an electrolyte 38 is circulated by way of pipes 39 and 40. Mounted in the axis of the cell is a cone-shaped electrode 41, the point 42 of which is in the axial center of a window 43 in the opposite wall of the cell. Light passing the window falls uniformly upon the conical surface of the electrode. In this instance the electrode 41 is formed of a suitable light sensitive material and a current is caused to flow through the electrolyte to a ring-shaped electrode 44 disposed within the cell and having connection with the cone electrode. When a solution from next to the retina of the eyes of rabbits is used and a portion of the retina used for the cone 41 with the optic nerve endings all shorted to a platinum foil connected to the conductor, light passing through the window 43 will be translated into electrical impulses. A current indicating device (not shown) is inserted in the conductor to visibly indicate the amount of light intensity.

In the form of the invention shown in Fig. 9, the cell 47 is somewhat similar to the cell illustrated in Figs. 7 and 8, however, the light sensitive element comprises a plurality of pins or cone-shaped points 45 having connection with suitable current measuring devices through conductors 46 and through a conductor 47 which connects with the ring electrode to complete the circuit. By providing for constant circulation of the electrolyte solution, the output of the cells is made greater and more stable and high frequency response is better. Also the temperature of the cell can be controlled by regulating the temperature of the flowing liquid. When the electrolyte is a light sensitive liquid and is caused to change in color, the color acts to protect the light sensitive electrode from injury should it be exposed to full sunlight.

From the foregoing it is obvious that I have provided an improved method and apparatus whereby varying intensity of light may be caused to vary the electrolytic properties of a flowing solution which, in turn, governs current flow in direct proportion to the intensity of the light.

What I claim and desire to secure by Letters Patent is:

1. The method of translating light intensities to electrical frequencies including, circulating an electrolyte having its electrical conductivity affected responsive to exposure to light in flowing contact with electrode elements of an electrical circuit, and subjecting the electrolyte while under flow and prior to contact with the electrodes to the action of light to be translated.

2. The method of translating light intensities to electrical frequencies including, circulating an electrolyte having its electrical conductivity affected responsive to exposure to light in flowing contact with electrode elements of an electrical circuit, subjecting the electrolyte while under flow and prior to contact with the electrodes to the action of the light to be translated, restoring the light sensitive properties of the electrolyte, and recirculating the restored electrolyte.

3. The method of translating light intensities to electrical intensities including, flowing a light sensitive solution having its electrical conductivity variable responsive to the action of light across a path of the light intensities to expose said solution, converting the solution to an electrolyte, and contacting the electrolyte with the electrodes of an electrical circuit.

4. The method of translating light intensities to electrical intensities of a corresponding value including, circulating a light sensitive solution across a path of the light intensities to expose said solution, admixing a developer solution with the light exposed solution to form an electrolyte, and contacting the electrolyte with the electrodes of an electrical circuit.

5. The method of indicating changes in light intensities in terms of an electric current flow in a circuit, including forming an electrolyte of varying conductivity by exposing a continuously moving stream of electrolytic solution to action of an light, and contacting the stream of electrolyte with electrodes in said circuit.

6. The method of indicating changes in light intensities in terms of an electric current flow in a circuit including, exposing a continuously moving stream of electrolytic solution to action of an light, admixing a developing solution with the exposed solution to form an electrolyte of varying conductivity, and contacting the stream of electrolyte with electrodes in said circuit.

7. The method of indicating changes in light intensities in terms of an electric current flow in a circuit, including exposing a continuously moving stream of electrolytic solution to action of an light to form an electrolyte of varying conductivity, moving the exposed portions of the stream of electrolyte progressively into contact with electrodes in said circuit, resensitizing the light sensitivity characteristics of said solution, and recirculating the resensitized solution.

8. An apparatus for indicating changes in light intensities in terms of electric current flow including, a light sensitive cell having passageways therein, electrode elements in the cell, a window in the cell for passing light into the cell, means connected to said cell for circulating an electrolytic solution through the passageways in the cell and across said window, and means connected to the electrode elements for indicating said current flow.

9. An apparatus for indicating changes in light intensities in terms of electric current flow including, a light sensitive cell, electrode elements in the cell, a window in the cell for passing light into the cell, means connected to said cell for circulating an electrolytic solution having its electrical conductivity variable responsive to exposure to light through the cell and across said window, means connected with the cell for admitting a developing solution for reacting with the electrolytic solution in the cell to form an electrolyte of varying current carrying capacity for varying current flow between said electrodes, and means connected in the circuit of said electrodes to indicate the current flow.

10. An apparatus for indicating changes in light intensities in terms of electric current flow including, a cell, electrode elements in the cell, a window in the cell for passing light into the cell, a source of electrolytic solution having its electrical conductivity variable responsive to exposure to light, and a pump connected with the source of supply and the cell for circulating said electrolytic solution through the cell and across said window.

11. An apparatus for indicating changes in light intensities in terms of electric current flow including, a light sensitive cell, electrode elements in the cell, a window in the cell for passing light into the cell, a source of electrolytic solution having its electrical conductivity variable responsive to exposure to light, a pump connected with the source of supply and the cell for circulating said electrolytic solution through the cell and across said window, said solution forming an electrolyte of a current carrying capacity proportional to the light intensity acting upon said solution for varying current flow between said electrodes, and means connected to the electrode elements for indicating said current flow.

12. In an apparatus of the character described, a cell, a plurality of electrodes in the cell, means for circulating an electrolytic solution having its electrical conductivity variable responsive to action of light through the cell, and a light filtering window in the cell formed of a material for passing selected light rays and for filtering out undesired light rays.

13. In an apparatus of the character described, a cell having a window therein for passing light into the cell, a plurality of electrodes in the cell, an electrolyte solution in the cell having its electrical conductivity variable responsive to light waves of predetermined character, and means for circulating the solution through the cell.

14. In an apparatus of the character described, a cell, a pair of electrodes in the cell, means for circulating an electrolyte solution having its electrical conductivity variable responsive to action of light through the cell sensitive to predetermined light rays, and a window in the cell for filtering out light other than the predetermined light rays.

EMMETT F. SARVER.